(12) United States Patent
Stegmiller et al.

(10) Patent No.: US 10,214,357 B2
(45) Date of Patent: Feb. 26, 2019

(54) LIFT ROLLER FOR POWER DRIVE UNIT

(71) Applicant: GOODRICH CORPORATION, Charlotte, NC (US)

(72) Inventors: Wesley K. Stegmiller, Jamestown, ND (US); Justin D. Williams, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/621,720

(22) Filed: Jun. 13, 2017

(65) Prior Publication Data
US 2018/0354721 A1 Dec. 13, 2018

(51) Int. Cl.
*B65G 13/06* (2006.01)
*B64D 9/00* (2006.01)

(52) U.S. Cl.
CPC .......... *B65G 13/065* (2013.01); *B64D 9/00* (2013.01); *B64D 2009/006* (2013.01)

(58) Field of Classification Search
CPC .............................. B65G 13/06; B65G 13/065
USPC ...................................... 198/782; 193/35 SS
See application file for complete search history.

(56) References Cited

U.S. PATENT DOCUMENTS

| | | | | |
|---|---|---|---|---|
| 3,698,539 A | * | 10/1972 | Schwarzbeck | B65G 13/065 198/722 |
| 3,782,527 A | * | 1/1974 | Petershack | B65G 47/54 193/35 SS |
| 3,854,576 A | * | 12/1974 | Bowman | B65G 47/261 198/835 |
| 5,984,615 A | * | 11/1999 | Sundseth | B64C 1/20 198/782 |
| 7,721,875 B2 | * | 5/2010 | Stegmiller | B64D 9/00 198/782 |
| 8,104,779 B2 | * | 1/2012 | Gyuricsko | B62B 5/023 280/43 |
| 8,132,964 B2 | | 3/2012 | Gyuricsko et al. | |
| 2008/0310944 A1 | | 12/2008 | Stegmiller | |

FOREIGN PATENT DOCUMENTS

| | | |
|---|---|---|
| DE | 4033762 | 5/1991 |
| EP | 0758608 | 2/1997 |

OTHER PUBLICATIONS

European Patent Office, European Search Report dated Oct. 12, 2018 in Application No. 18177273.2-1010.

* cited by examiner

*Primary Examiner* — James R Bidwell
(74) *Attorney, Agent, or Firm* — Snell & Wilmer L.L.P.

(57) ABSTRACT

A lift roller may include a hub having a first surface, a second surface opposite the first surface, and a radially outward surface. The hub may define a channel extending through the hub from the first surface to the second surface. The lift roller may also include a rim portion rotatably disposed about the radially outward surface of the hub and a boss disposed on one of the first surface and the second surface.

9 Claims, 8 Drawing Sheets

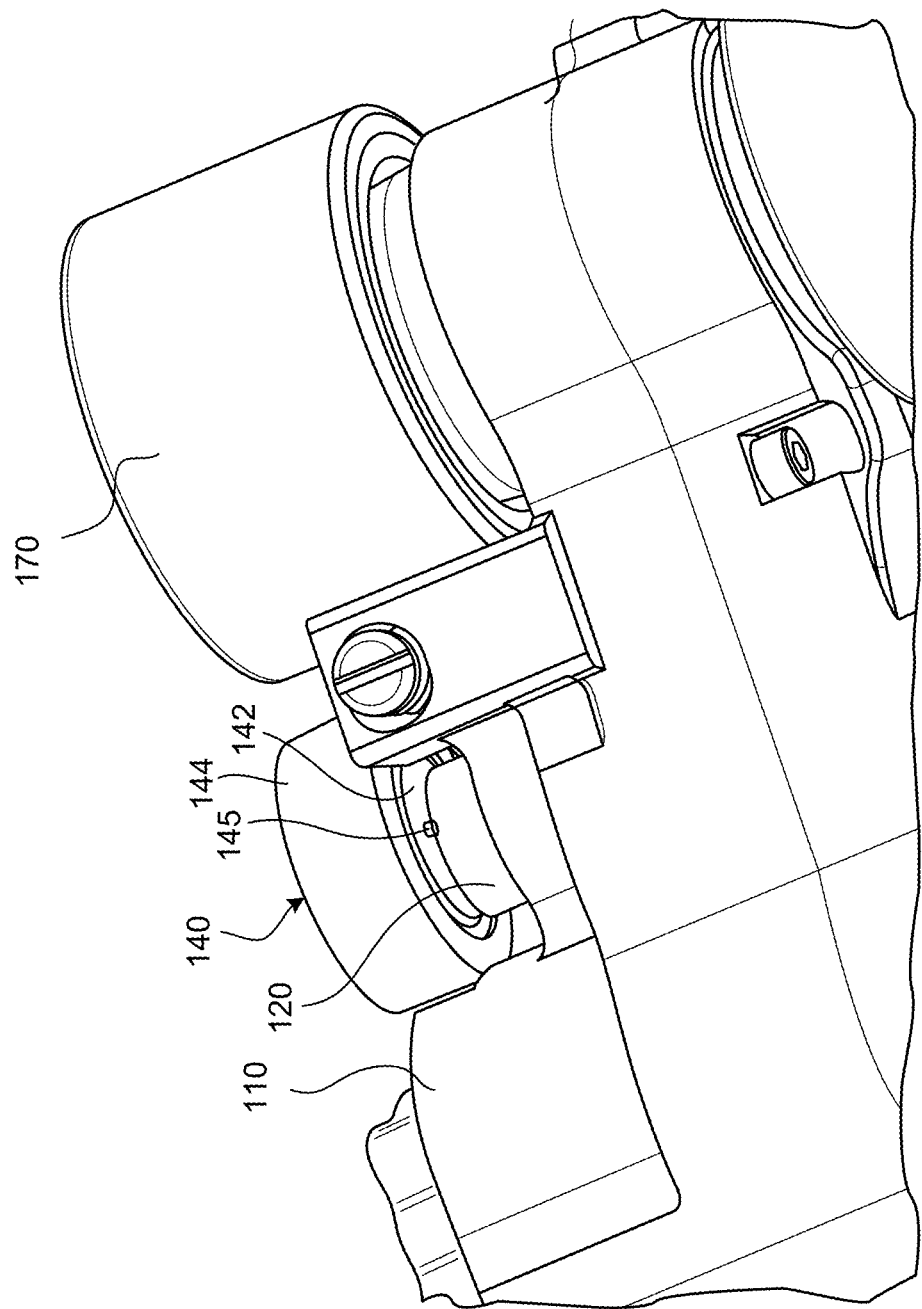

LIFT ROLLER FOR POWER DRIVE UNIT

FIELD

The present disclosure relates to cargo management systems, and more specifically, to lift rollers on power drive units of cargo management systems.

BACKGROUND

Conventional cargo systems typically include various tracks and rollers. For example, an aircraft cargo system may span a length of an aircraft and may be configured to load and unload aircraft cargo. Power drive units ("PDUs") convey cargo forward and aft along the aircraft on conveyance rollers which are attached to the aircraft floor structure. For example, cargo may be loaded from an aft position on an aircraft and conducted on a unit load device ("ULD") or a pallet by the cargo system to a forward position and/or, depending upon aircraft configuration, cargo may be loaded from a forward position on an aircraft and conducted by the cargo system to an aft position. Power drive units can be configured to raise and lower to selectively engage and drive/propel a unit load device in a desired direction over a cargo deck's roller elements.

SUMMARY

According to various embodiments, the present disclosure provides a lift roller that includes a hub, a rim portion, and a boss. The hub includes a first surface, a second surface opposite the first surface, and a radially outward surface, according to various embodiments. The hub may define a channel extending through the hub from the first surface to the second surface. The rim portion may be rotatably disposed about the radially outward surface of the hub and the boss may be disposed on one of the first surface and the second surface.

In various embodiments, the rim portion is configured to rotate about a roller axis of the hub, wherein the channel has a channel axis that is parallel to and offset from the roller axis. In various embodiments, the channel has a non-circular cross-sectional shape. The non-circular cross-sectional shape may be symmetrical. For example, the non-circular cross-sectional shape may be lobed and thus the hub may define a first lobe portion of the channel, a second lobe portion of the channel, and a third lob portion of the channel. In various embodiments, the first lobe portion is disposed closer to a roller axis than the second lobe portion and the third lobe portion, wherein the boss is disposed adjacent the first lobe portion.

In various embodiments, the boss is integrally formed with the hub. In various embodiments, the boss is coupled to the hub. In various embodiments, the hub defines a recess and the boss is press fit into the recess.

Also disclosed herein, according to various embodiments, is an eccentric lift roller assembly that includes a shaft, a spindle, and the lift roller. The shaft may have a shaft centerline axis, the spindle may be non-rotatably coupled to and may extend from a shoulder of the shaft. Further, the spindle may include a spindle centerline axis that is parallel and offset relative to the shaft centerline axis. The lift roller may be non-rotatably coupled to the spindle. The boss of the lift roller may be disposed radially outward of the shaft and the spindle.

In various embodiments, a first distance along the roller axis between a tip of the boss and the other of the first surface and the second surface is greater than a second distance along the spindle centerline axis between the shoulder of the shaft and an end of the spindle. In various embodiments, the eccentric lift roller assembly further includes a retaining ring coupled to an end of the spindle and configured to engage the other of the first surface and the second surface to retain the lift roller coupled to the spindle. The end of the spindle may include a retaining ring notch. A first distance along the roller axis between a tip of the boss and the other of the first surface and the second surface is greater than a second distance along the spindle centerline axis between the shoulder of the shaft and the retaining ring notch, according to various embodiments. In various embodiments, the symmetrical, non-circular cross-sectional shape is lobed and thus the hub defines a first lobe portion of the channel, a second lobe portion of the channel, and a third lob portion of the channel. The first lobe portion is disposed farther from the shaft centerline axis than the second lobe portion and the third lobe portion, wherein the boss is disposed adjacent the first lobe portion, according to various embodiments.

Also disclosed herein, according to various embodiments, is a power drive unit for a cargo management system. the power drive unit may include a housing and the the shaft may be rotatably mounted in the housing. The power drive unit may further include the spindle, the lift roller, and the retaining ring. In various embodiments, a first distance along the roller axis between a tip of the boss and the other of the first surface and the second surface is greater than a second distance along the spindle centerline axis between a shoulder of the shaft and an end of the spindle. In various embodiments, a first distance along the roller axis between a tip of the boss and the other of the first surface and the second surface is greater than a second distance along the spindle centerline axis between a shoulder of the shaft and the retaining ring notch.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 3 illustrates a perspective view of a boss of a hub of a lift roller, in accordance with various embodiments;

Figure 1:
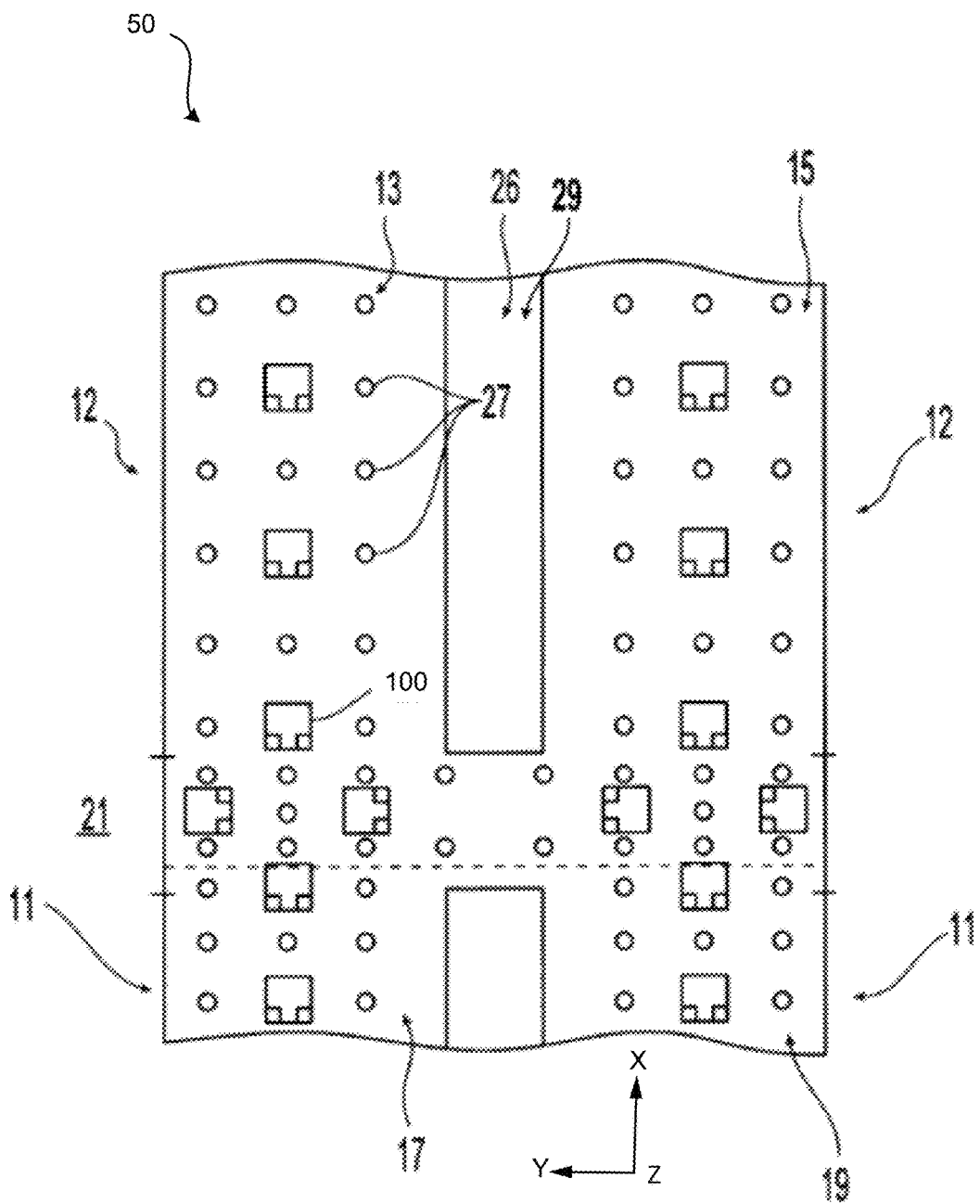
FIG. 1 illustrates a cargo system of an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

Cargo management systems, as disclosed herein, are used to load, move, and unload cargo. While numerous examples and details are included below with reference to aircraft cargo systems, it is expected that the present disclosure may apply to other, non-aircraft type cargo systems.

FIG. 1 illustrates an aircraft cargo deck 29 that can be used to implement various embodiments of the present disclosure. A generally H-shaped conveyance surface 26 forms a deck of an aircraft, adjacent a cargo bay loading door. However, there are many other aircraft cargo deck configurations to which the embodiments of the disclosure can be implemented. For example, various aircraft, particularly those configured primarily for the transportation of cargo without passengers, have the main passenger deck removed and an additional larger cargo deck installed. Other aircraft may have three or more parallel longitudinal tracks rather than the H-shape shown in FIG. 1.

The cargo management system 50 may include one or more cargo shuttles that are configured to slide across floor panels or roll across the conveyance rollers 27. The cargo shuttles may be unit load devices, pallets, or other components on which cargo may be secured. In various embodiments, the cargo system 50 includes guide rails that are configured to guide the cargo shuttles. For example, guide rails may be disposed along the aforementioned sections of the conveyance surface 26 and/or may be disposed along the cargo tracks to restrict and restrain the movement of the cargo shuttles. The guide rails may be coupled/mounted to an airframe of the aircraft. In various embodiments, one or more restraint assemblies are coupled to the guide rails to facilitate vertical restraint (z axis) and lateral restraint (y axis) of the cargo shuttles along and across the conveyance surface 26.

The cargo loading system 50 may include a plurality of freely rotating conveyance rollers 27 mounted in the cargo deck to define the conveyance plane. Cargo loaded onto the aircraft cargo deck can be moved manually throughout the cargo bay upon the freely rotating conveyance rollers. However, it is desirable to electro-mechanically propel the cargo with minimal or no manual assistance. In that regard, the H-shaped cargo surface includes a number of power drive units 100 that provide a mechanism upon which cargo is propelled over the conveyance rollers 27. Each power drive unit 100 typically includes a drive roller element which can be raised from a lowered position beneath the cargo deck to a raised/elevated position in order to drive the unit load devices across the conveyance rollers.

Figure 2A:
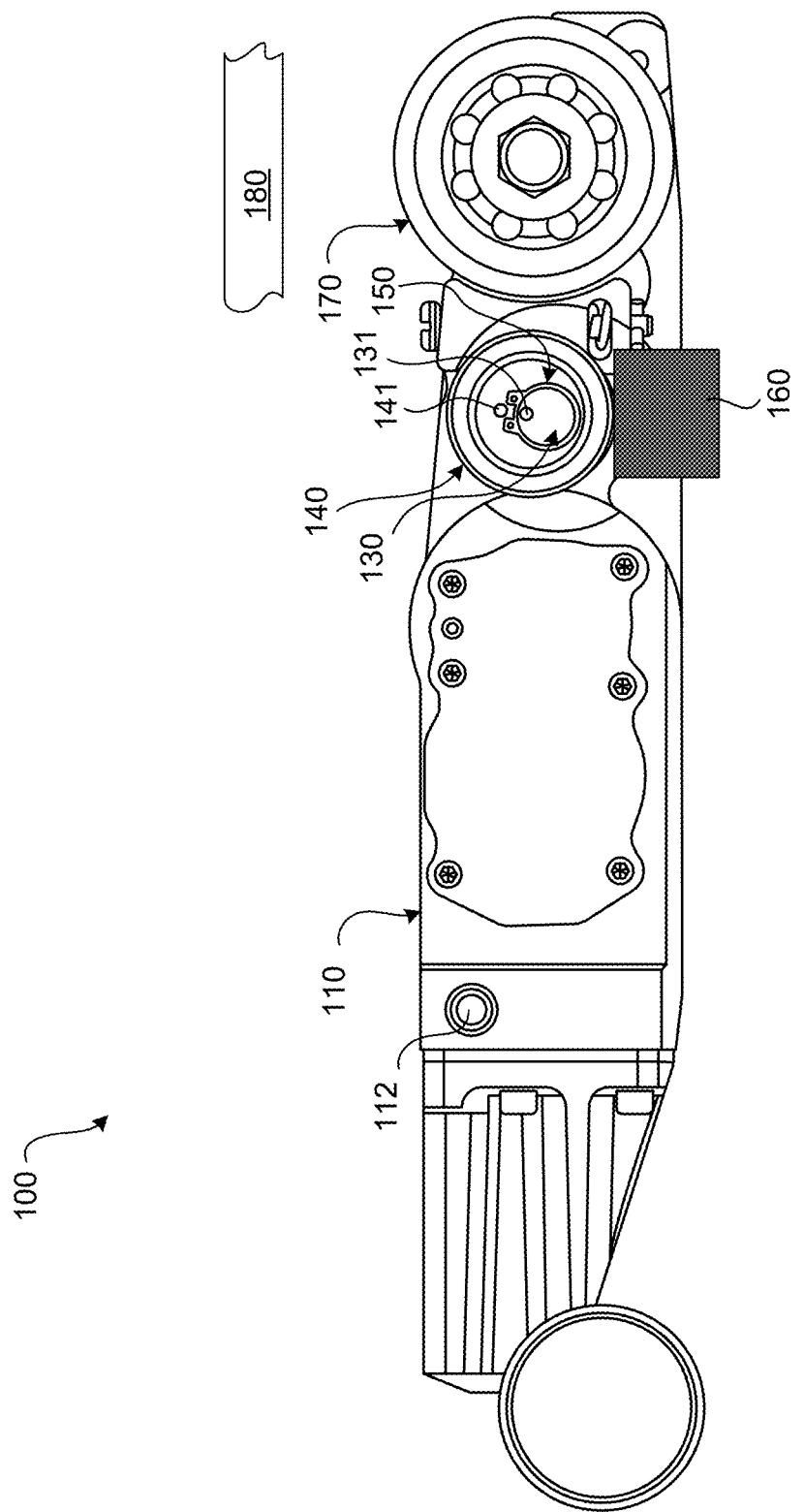
FIG. 2A illustrates a power drive unit in a lowered position, in accordance with various embodiments.
Figure 2B:
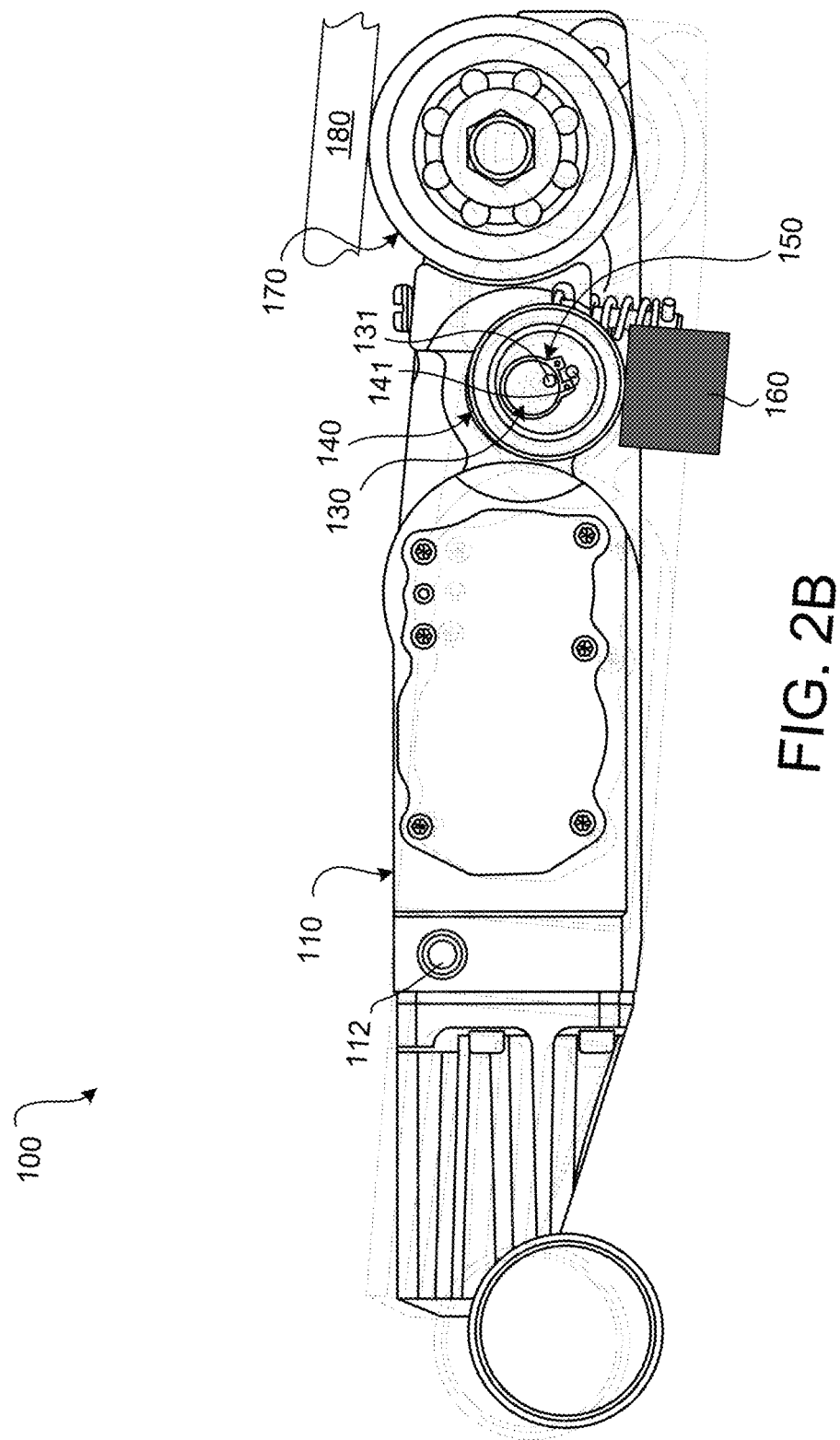
FIG. 2B illustrates a power drive in a raised position, in accordance with various embodiments.

As shown in FIGS. 2A and 2B, power drive unit 100 includes a substantially rigid housing 110 having a pair of opposed and aligned hinge pins 112 outwardly extending from the sides on one end of the housing 110, according to various embodiments. On an opposite end of the power drive unit 100 from the hinge pins 112, the power drive 100 unit 100 includes at least one drive roller 170 rotatably mounted to the housing 110, according to various embodiments. In various embodiments, the power drive unit 100 also includes one or more eccentric lift rollers 140. The eccentric lift rollers 140 operate to selectively lift or lower the non-hinged end (e.g., the drive roller 170) of the housing 110. In FIG. 2A, the power drive unit 100 is shown in a lowered/retracted position and in FIG. 2B, the power drive unit 100 is shown in a raised/elevated/deployed position, according to various embodiments. FIG. 2B further shows dashed lines of the power drive unit in the lowered position.

The eccentric lift roller 140 is operable to selectively raise and lower the non-hinged end of the housing 110, according to various embodiments. For example, and with reference to FIGS. 2A, 2B, and 3, a shaft 120 may be rotatably mounted in the housing 110 (e.g. via drive gears 115) and a spindle 130 may extend from an end of the shaft 120, according to various embodiments. The spindle 130 may be eccentric relative to the shaft 120. Said differently, and with momentary reference to FIGS. 4A and 4B, a spindle centerline axis 173 may be parallel but offset relative to a shaft centerline axis 172, according to various embodiments. In various embodiments, and with renewed reference to FIGS. 2A, 2B, and 3, the lift roller 140 may be non-rotatably coupled to the spindle 130 using, for example, a retaining ring 150. As described in greater detail below, the engagement between the lift roller 140 and the spindle 130 may also be eccentric. Accordingly, the power drive unit 100 may have a dual eccentric configuration in which the spindle 130 is offset and eccentric relative to the shaft 120 and the lift roller 140 is offset and eccentric relative to the spindle 130.

In various embodiments, because of the eccentric configuration of the power drive unit 100, powered rotation of the shaft 120 may cause the non-hinged end of the housing 110 (e.g., the end of the power drive unit 100 having the drive roller 170) to move to the raised position shown in FIG. 2B, thereby bringing the drive roller 170 into driving (e.g., propelling) engagement with, for example, a unit load device 180. In various embodiments, the lift roller 140 may be in contact with a reaction structure, such as block 160. Powered rotation of the shaft 120 creates a corresponding rotation of the lift roller 140 (via the spindle 130) and, due to the eccentricities of the relative components, the lift roller 140 pushes the non-hinged end of the housing 110 upwards and away from a supporting structure 105 (with reference to FIGS. 4A and 4B), such as an airframe of an aircraft.

In various embodiments, and with reference to FIG. 3, the lift roller 140 may include a hub 142, a rim portion 144, and a boss 145. The boss 145 may be a pin, bar, or other protrusion that extends from an inward, relative to the power drive unit 100, side of the hub 142. As described in greater detail below, the boss 145 helps to ensure proper assembly and installation of the lift roller 140 onto the spindle 130 that extends from the shaft 120, according to various embodiments. Said differently, the boss 145 helps to properly align the lift roller 140 relative to the spindle 130 (and may even prevent improper installation) so that the above discussed eccentric formations are properly configured to raise and lower the power drive unit 100. Additional details pertaining to the boss 145 are included below, for example with reference to FIG. 4C.

In various embodiments, and with reference to the cross-sectional views of FIGS. 4A, 4B, 6A, and 6B, details of the lift roller 140 and further details pertaining to operation of the power drive unit 100 in conjunction with the lift roller 140 are provided. In various embodiments, the lift roller 140 includes hub 142, rim portion 144, and boss 145. The hub 142 of the lift roller 140 may have a first surface 146, a second surface 147, and a radially outward surface 148. In various embodiments, the hub 142 may include two plates, an outer and an inner plate, that cooperate to seal bearings 143 within the lift roller 140. The outer plate and inner plates, according to various embodiments, can be connected by a rivet, or any other connecting device or securing means.

The hub 142 may define a channel 155 extending through the hub 142 from the first surface 146 to the second surface 147. The rim portion 144 of the lift roller 140 may be disposed about the radially outward surface 148 of the hub 142 and may be configured to rotate around a roller axis 174. In order to enable the relative rotation between the rim portion 144 and the hub 142, one or more bearings 143 may be disposed between the rim portion 144 and the hub 142 (e.g., the hub 142 may form an inner race and the rim portion may form and outer race of a bearing assembly). The rim portion 144 may be cylindrical. In various embodiments, the rim portion 144 is crowned such that a radially outward surface of the rim portion 144 has a convex curvature. A first retention ring 156 and a second retention ring 157 may be implemented to rotatably couple the rim portion 144 to the hub 142.

In various embodiments, the channel 155 may be offset relative to the roller axis 174, thereby creating the eccentric configuration between the spindle 130 and the lift roller 140. In other words, an axis of the channel 155 (e.g., a channel axis) may be parallel to but offset from the roller axis 174. The spindle 130, which itself is eccentric relative to the shaft 120, is inserted within the eccentric channel 155 defined in the hub 142 of the lift roller 140. Thus, the channel axis may be aligned and coincident with the spindle centerline axis 173.

Figure 4A:
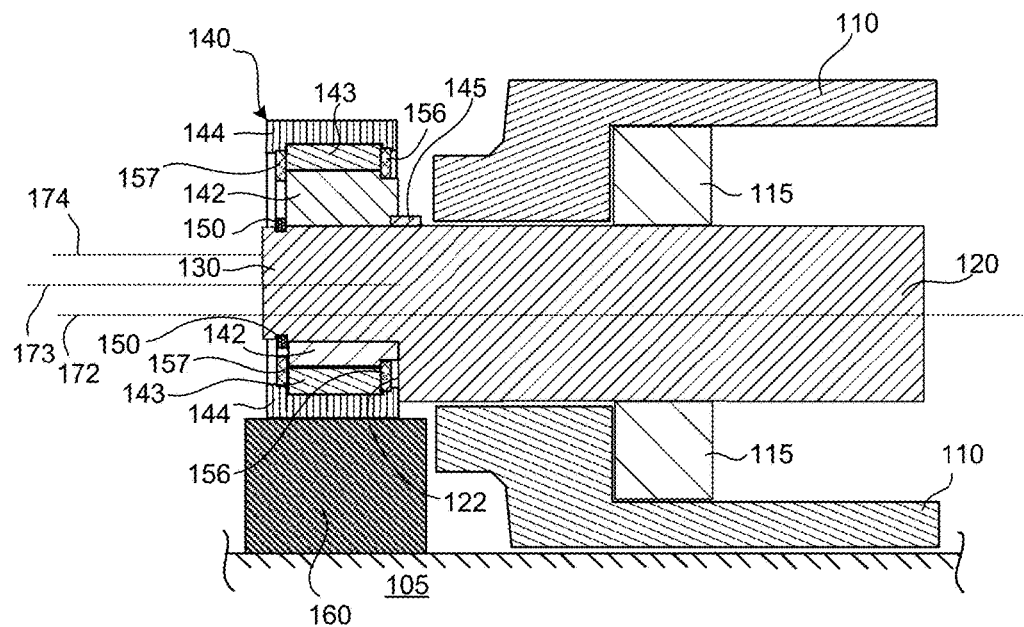
FIG. 4A illustrates a cross-sectional view of a power drive unit in a lowered position, in accordance with various embodiments.

In various embodiments, and with reference to FIG. 4A, the power drive unit 100 is shown in the lowered/retracted position. In this position, the lowermost, radially outer edge of the lift roller 140 is at its uppermost elevation relative to the housing 110. In this position, the non-hinged end of the housing 110 and the drive roller 170 connected thereto are supported by the lift roller 130 at its lowest position relative to block 160 and supporting structure 105, and the uppermost surfaces of the drive roller 170 are substantially below the unit load device (or at least below the plane where unit load devices and other cargo are conveyed).

Figure 4B:
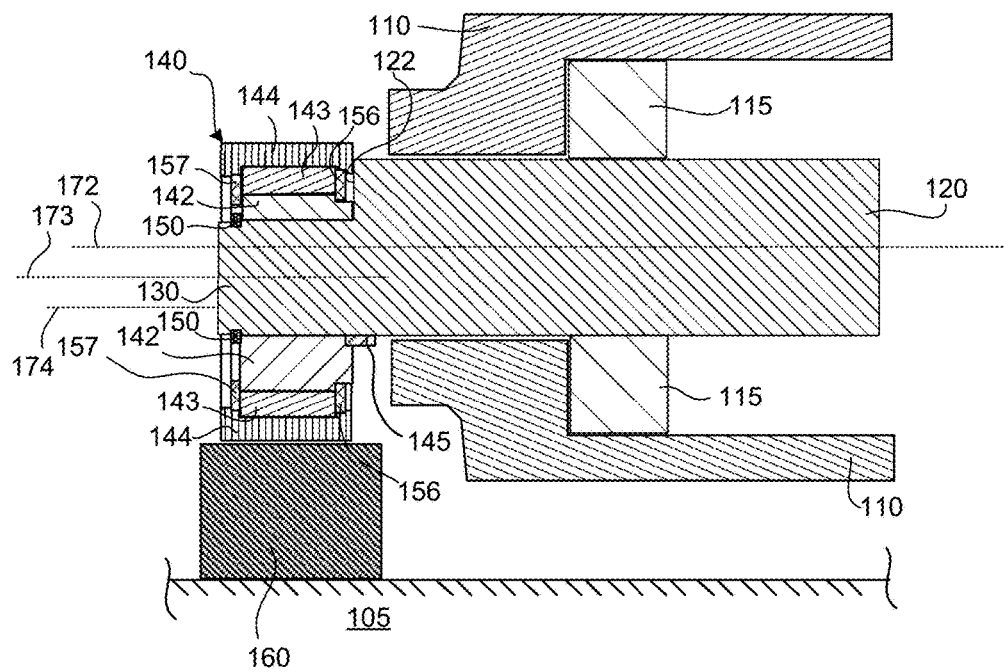
FIG. 4B illustrates a cross-sectional view of a power drive unit in a raised position, in accordance with various embodiments.

In various embodiments, and with reference to FIG. 4B, the power drive unit 100 is shown in the raised position. In this position, the lowermost, radially outer edge of the lift roller 140 is at its lowermost elevation relative to the housing 110. In this position, the non-hinged end of the housing 110 and the drive roller 170 connected thereto are supported by the lift roller 140 at its highest position relative to block 160 and supporting structure 105, and the uppermost surfaces of the drive roller 170 are raised to engage, drive, or propel unit load devices and other cargo.

In various embodiments, the channel 155 defined in the hub 142 of the lift roller 140 has a non-circular cross-sectional shape and the spindle 130 has a complementary shape, thereby preventing relative rotation between the spindle 130 and the lift roller 140 (i.e., the lift roller 140 may be non-rotatably coupled to the spindle 130). In various embodiments, the non-circular cross-sectional shape of the channel 155 is symmetrical. In various embodiments, the symmetrical shape of the channel 155 imparts various structural benefits to the eccentric lift roller assembly (when compared with, for example, a non-symmetrical cross-sectional shape). For example, a symmetrical channel 155 and spindle 130 would more evenly distribute mechanical stress throughout the assembly than an asymmetrical geometry. In various embodiments, for example, the symmetrical, non-circular cross-sectional shape of the channel 155 may be lobed and thus the hub 142 may define a first lobe portion 136, a second lobe portion 137, and a third lobe portion 138, according to various embodiments.

In various embodiments, and with continued reference to FIGS. 4A, 4B, 6A, and 6B, because of the symmetrical shape of the channel 155 (and complementary spindle 130), without the boss 145 mentioned above, a lift roller could be potentially assembled/installed onto the spindle 130 in an improper orientation. For example, the power drive unit 100 disclosed herein is configured to have the dual eccentric configuration described above in order to sufficiently raise and lower the drive roller 170 of the power drive unit 100. However, if a lift roller (e.g., one that does not have the boss 145 provided herein) were to be installed in an undesired and improper orientation onto the spindle 130, the eccentricity between the channel and the spindle 130 would potentially partially offset the eccentricity between the spindle 130 and the shaft 120, thus reducing or eliminating the effectiveness of the power drive unit 100. While conventional solutions to this problem have involved utilizing alignment markings (e.g., 131, 141, with momentary reference to FIGS. 2A and 2B) to encourage proper installation and orientation of the lift rollers relative to the spindles, mistakes during assembly/manufacture still occur. Accordingly, the boss 145 extending from the hub 142 prevents a user from incorrectly installing/orienting the lift roller 140 relative to the spindle 130 by only allowing the lift roller 140 to be installed and retained on the spindle 130 in a desired orientation, according to various embodiments.

In various embodiments, and with reference to FIGS. 4A and 4B, the boss 145 is disposed so as to be radially outward of the shaft 120 and the spindle 130. With the boss 145 disposed radially outward of the shaft 120 and the spindle 130, the first surface 146 or the second surface 147 of the hub 142 (whichever surface the boss 145 is protruding from, e.g., the first surface 146 in the depicted embodiments) is disposed, in an assembled/installed state, adjacent the shoulder 122 of the shaft. That is, the lift roller 140 can be inserted far enough onto the spindle 130 to allow, for example a retaining ring 150 to couple to an end of the spindle 130 to hold and retain the lift roller 140 in place on the spindle 130. In various embodiments, for example, the end of the spindle 130 includes a retaining ring notch 135 (with reference to FIGS. 4C and 5A).

Figure 4C:
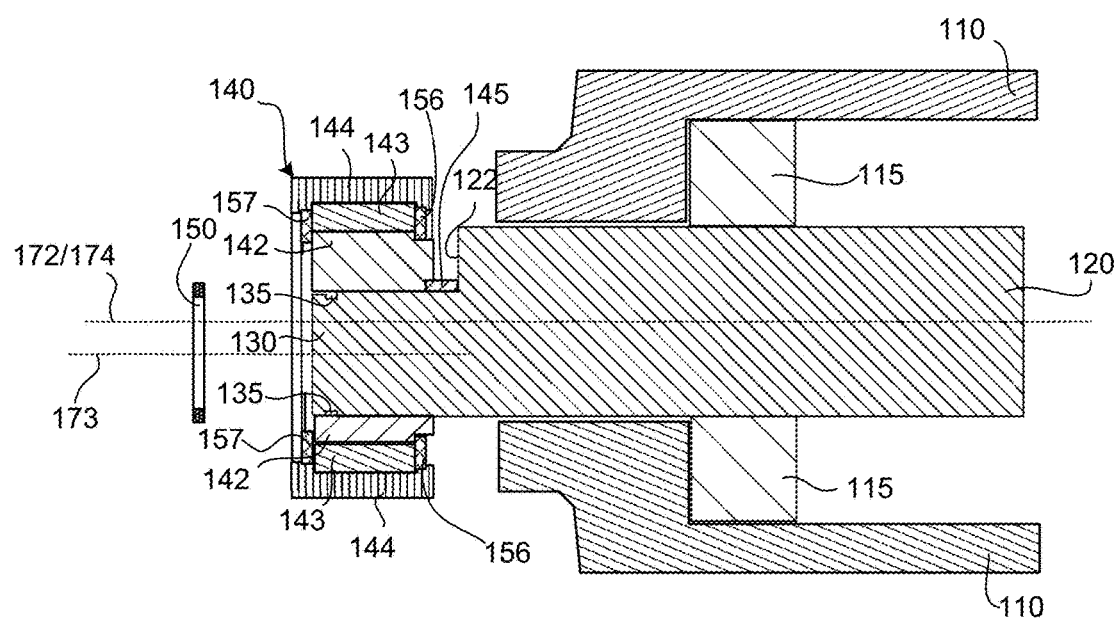
FIG. 4C illustrates a cross-sectional view of a power drive unit partially assembled in an incorrect configuration, in accordance with various embodiments.
Figure 5A:
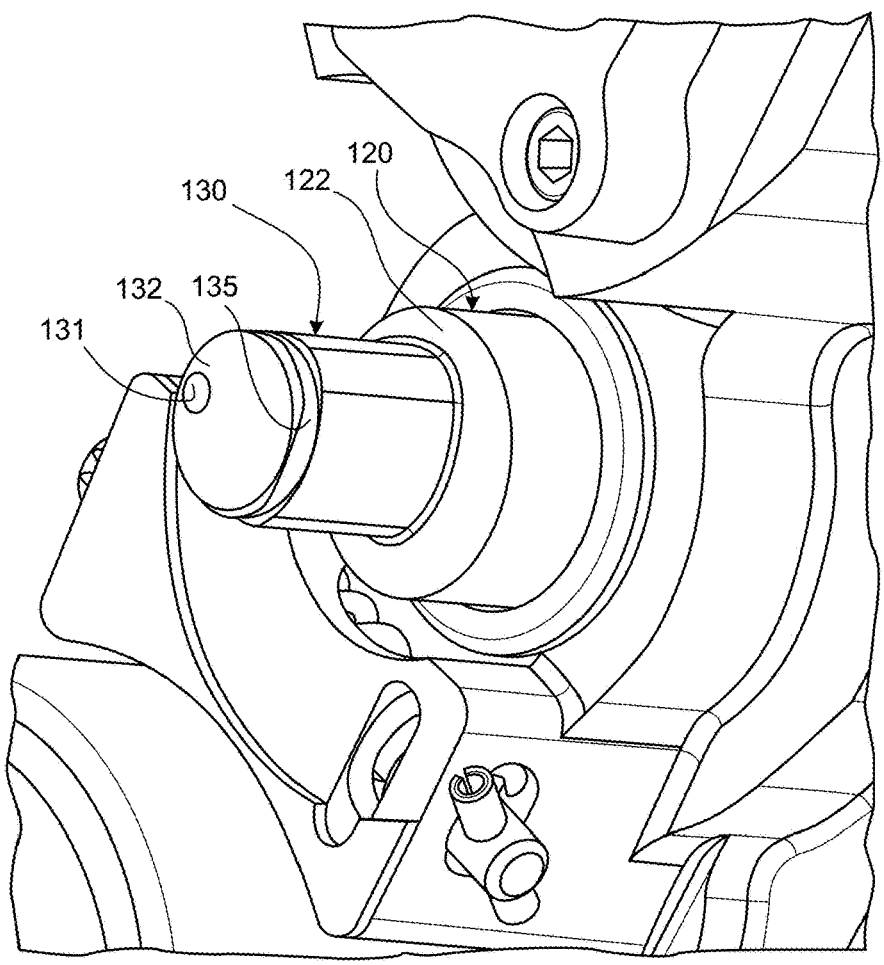
FIGS. 5A and 5B illustrate a shaft and a spindle of an eccentric lift roller assembly, in accordance with various embodiments.
Figure 5B:
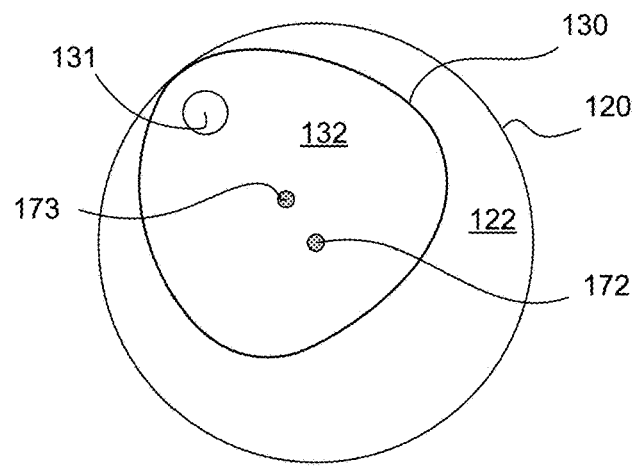

If a user or an operator were to try and install the lift roller 140 onto the spindle 130 in an incorrect orientation, such as the one shown in FIG. 4C, the boss 145 would engage and abut against the shoulder 122 of the shaft 120 (see also FIG. 5B, which shows a view of the spindle 130 and shaft 120 looking down shaft centerline axis 172), which would prevent the lift roller 140 from being completely inserted over the spindle 130, thus not leaving sufficient room at the end of the spindle 130 for the retaining ring 150, or other suitable fastener, to attach thereto. Accordingly, FIG. 4C shows the retaining ring 150 removed a distance from the spindle 130 and shows the hub 142 covering the retaining ring notch 135. Also to note in FIG. 4C, because of the improper orientation of the lift roller 140 relative to the spindle 130, the magnitude of the movement of the power drive unit 100 between raised and lowered position is compromised, thus at least partially cancelling out the eccentric offsets.

Accordingly, a first distance along the roller axis 174 between a tip of the boss 145 and the opposing surface (e.g., the other of the first surface 146 and the second surface 147) of the hub 142 is greater than a second distance along the spindle centerline axis 173 between the shoulder 122 of the shaft 120 and the end of the spindle 130, according to various embodiments. In various embodiments, a first distance along the roller axis 174 between the tip of the boss 145 and the opposing surface (e.g., 147) of the hub 142 is greater than a second distance along the spindle centerline axis 173 between the shoulder 122 and the retaining ring notch 135.

In various embodiments, the hub 142 and the boss 145 may be integrally formed of a single material. In various embodiments, the boss 145 may be attached/mounted to the hub 142 of the lift roller 140. For example, the hub 142 may have a recess 175 formed therein and the boss 145 may be mounted therein using an adhesive, a welding technique, a press fit, friction welding, or the like. In various embodiments, the boss 145 has a circular cross-sectional shape. In various embodiments, the boss 145 has a non-circular cross-sectional shape.

Figure 6A:
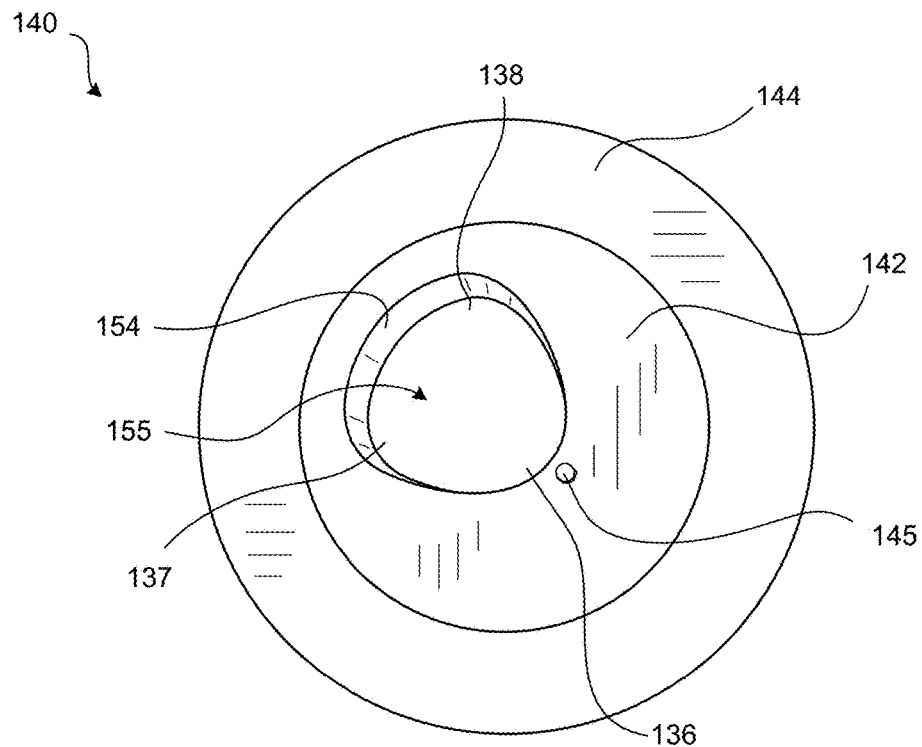
FIGS. 6A and 6B illustrate a lift roller of an eccentric lift roller assembly, in accordance with various embodiments.
Figure 6B:
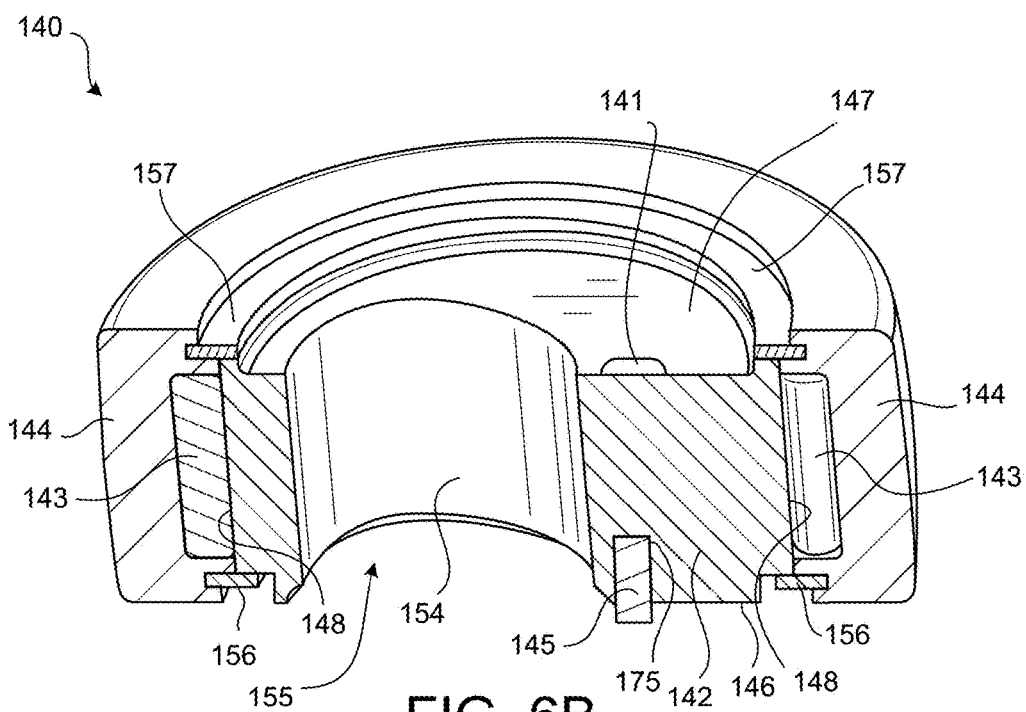

In various embodiments, as introduced above and with reference to FIG. 6A, the channel 155 defined in the hub 142 of the lift roller 140 may have various lobe portions 136, 137, 138. For example, the channel 155 (and thus the complementary spindle 130) may have a first lobe portion 136, a second lobe portion 137, and a third lobe portion 138. In various embodiments, and with reference to FIGS. 4A, 4B, and 6A, the first lobe portion 136 is disposed farther from the shaft centerline axis 172 than the second lobe portion 137 and the third lobe portion 138. In such embodiments, the boss 145 may be disposed adjacent the first lobe portion 136. Said differently, the first lobe portion 136 may be disposed closer to the roller axis 174 than the second lobe portion 137 and the third lobe portion 138, and the boss 145 may be disposed adjacent the first lobe portion 136.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An eccentric lift roller assembly comprising:
    a shaft comprising a shaft centerline axis;
    a spindle non-rotatably coupled to and extending from a shoulder of the shaft, the spindle comprising a spindle centerline axis that is parallel and offset relative to the shaft centerline axis;
    a lift roller non-rotatably coupled to the spindle, the lift roller comprising:
        a hub comprising a first surface, a second surface opposite the first surface, a roller axis, and a radially outward surface, the hub defining a channel extending through the hub from the first surface to the second surface, the roller axis being offset relative to the shaft centerline axis and the spindle centerline axis;

a rim portion rotatably disposed about the radially outward surface of the hub and configured to rotate about the roller axis; and a boss disposed on one of the first surface and the second surface; and a retaining ring coupled to an end of the spindle and configured to engage the other of the first surface and the second surface to retain the lift roller coupled to the spindle;

wherein the boss is disposed radially outward of the shaft and the spindle.

2. The eccentric lift roller assembly of claim 1, wherein a first distance along the roller axis between a tip of the boss and the other of the first surface and the second surface is greater than a second distance along the spindle centerline axis between the shoulder of the shaft and an end of the spindle.

3. The eccentric lift roller assembly of claim 1, wherein the end of the spindle further comprises a retaining ring notch, wherein a first distance along the roller axis between a tip of the boss and the other of the first surface and the second surface is greater than a second distance along the spindle centerline axis between the shoulder of the shaft and the retaining ring notch.

4. The eccentric lift roller assembly of claim 1, wherein the channel has a symmetrical, non-circular cross-sectional shape.

5. The eccentric lift roller assembly of claim 4, wherein the symmetrical, non-circular cross-sectional shape is lobed and thus the hub defines a first lobe portion of the channel, a second lobe portion of the channel, and a third lob portion of the channel, wherein the first lobe portion is disposed farther from the shaft centerline axis than the second lobe portion and the third lobe portion, wherein the boss is disposed adjacent the first lobe portion.

6. A power drive unit for a cargo management system, the power drive unit comprising:

a housing;

a shaft rotatably mounted in the housing, the shaft comprising a shaft centerline axis;

a spindle non-rotatably coupled to and extending from a should of the shaft, the spindle comprising a spindle centerline axis that is parallel and offset relative to the shaft centerline axis;

a lift roller non-rotatably coupled to the spindle, the lift roller comprising:

a hub comprising a first surface, a second surface opposite the first surface, a roller axis, and a radially outward surface, the hub defining a channel extending through the hub from the first surface to the second surface, the roller axis being offset relative to the shaft centerline axis and the spindle centerline axis;

a rim portion rotatably disposed about the radially outward surface of the hub; and a boss disposed on one of the first surface and the second surface; and a retaining ring coupled to an end of the spindle and configured to engage the other of the first surface and the second surface to retain the lift roller coupled to the spindle;

wherein the boss is disposed radially outward of the shaft and the spindle.

7. The power drive unit of claim 6, wherein a first distance along the roller axis between a tip of the boss and the other of the first surface and the second surface is greater than a second distance along the spindle centerline axis between a shoulder of the shaft and an end of the spindle.

8. The power drive unit of claim 6, further comprising a retaining ring notch formed on an end of the spindle.

9. The power drive unit of claim 8, wherein a first distance along the roller axis between a tip of the boss and the other of the first surface and the second surface is greater than a second distance along the spindle centerline axis between a shoulder of the shaft and the retaining ring notch.

\* \* \* \* \*